US011403613B2

(12) United States Patent
Ahn et al.

(10) Patent No.: US 11,403,613 B2
(45) Date of Patent: Aug. 2, 2022

(54) PORTABLE TRANSACTION MODULE

(71) Applicant: Hyosung TNS Inc., Seoul (KR)

(72) Inventors: Young Ho Ahn, Hwaseong-si (KR); Yoo Mee Min, Seongnam-si (KR); Young Jin Yoon, Seoul (KR); Hyeokjun Yun, Seoul (KR); Won Seok Lee, Wonju-si (KR); Hee-youn Lee, Gwangju-si (KR); Byung Seok Han, Seongnam-si (KR)

(73) Assignee: Hyosung TNS Inc., Seoul (KR)

( * ) Notice: Subject to any disclaimer, the term of this patent is extended or adjusted under 35 U.S.C. 154(b) by 0 days.

(21) Appl. No.: 17/115,418

(22) Filed: Dec. 8, 2020

(65) Prior Publication Data

US 2022/0092577 A1 Mar. 24, 2022

(30) Foreign Application Priority Data

Sep. 23, 2020 (KR) .................. 10-2020-0122822
Sep. 23, 2020 (KR) .................. 10-2020-0122823

(51) Int. Cl.
*G06K 7/01* (2006.01)
*G06Q 20/32* (2012.01)
*G07F 19/00* (2006.01)
*G06K 7/10* (2006.01)

(52) U.S. Cl.
CPC ..... *G06Q 20/3221* (2013.01); *G06K 7/10415* (2013.01); *G06Q 20/3223* (2013.01); *G07F 19/20* (2013.01)

(58) Field of Classification Search
CPC .......... G06Q 20/3221; G06Q 20/3223; G06K 7/10415; G07F 19/20
See application file for complete search history.

(56) References Cited

U.S. PATENT DOCUMENTS

| 2004/0238637 A1* | 12/2004 | Russell | .................. | G06K 7/10 |
| | | | | 235/462.14 |
| 2006/0289629 A1 | 12/2006 | Smith et al. | | |
| 2013/0279106 A1 | 10/2013 | Ergun et al. | | |

FOREIGN PATENT DOCUMENTS

| CN | 204838838 | 12/2015 |
| EP | 3354289 | 8/2018 |
| EP | 3451304 | 3/2019 |
| JP | 60-108260 U | 7/1985 |
| JP | H09-152917 A | 6/1997 |
| JP | 2020-035313 A | 3/2020 |
| KR | 20-2012-0005173 U | 7/2012 |
| KR | 20-2015-0004034 U | 11/2015 |
| KR | 10-1808055 B1 | 12/2017 |

OTHER PUBLICATIONS

Teraoka Precision Co., Ltd., "Start selling the droplet infection prevention panel "Checker Guard"", Apr. 16, 2020, 4 pages <https://www.teraokaseiko.com/jp/news/press-release/2020/20200416010436/>.

* cited by examiner

*Primary Examiner* — Jamara A Franklin
(74) *Attorney, Agent, or Firm* — Fish & Richardson P.C.

(57) ABSTRACT

A portable transaction module to be placed at a space where business transactions between a teller and a customer are performed is provided. The portable transaction module includes a portable unit, and a customer-side digital module unit, for inputting information necessary for the business transactions, mounted at one side of the portable unit.

14 Claims, 18 Drawing Sheets

PORTABLE TRANSACTION MODULE

CROSS-REFERENCE TO RELATED APPLICATIONS

This application is based on and claims priority from Korean Patent Application No. 10-2020-0122822, filed on Sep. 23, 2020, and Korean Patent Application No. 10-2020-0122823, filed on Sep. 23, 2020, the disclosures of which are incorporated herein in their entirety by reference for all purposes.

TECHNICAL FIELD

The present disclosure relates to a portable transaction module.

BACKGROUND

In general, a teller in a bank prepares various office equipment and documents in order to consult with a customer and provide necessary information to the customer. By using the office equipment and the documents placed on a digital desk or in a drawer, the teller can provide necessary information to the customer while doing his/her work.

However, putting the office equipment and the documents on the digital desk, the top of the desk can be messy and the space on the desk may be insufficient to provide materials to a customer when consulting with the customer. Meanwhile, when the office equipment, the documents and the like are put in the drawer, it may be inconvenient to use the office equipment and the documents and the like as the teller needs to take out the office equipment and the documents and the like from the drawer. In particular, in an epidemic of an infectious disease, when a teller and a customer make face-to-face consultation with a digital desk between them, proper consultation between the teller and the customer may be difficult due to the fear of infection.

SUMMARY

In view of the above, the present disclosure provides a portable transaction module which allows a teller and a customer to efficiently perform business transactions therebetween.

In accordance with an implementation of the present disclosure, there is provided a portable transaction module to be placed at a space where business transactions between a teller and a customer are performed, the portable transaction module including: a portable unit; and a customer-side digital module unit, for inputting information necessary for the business transactions, mounted at one side of the portable unit.

The portable unit may include a portable board unit, where the portable board unit is formed by bending a plate member having a board shape, and at least one side of the portable board unit is opened.

The portable board unit may include: a bottom surface portion having a reference plane; a first inclined surface portion inclined at a first inclination angle with respect to the reference plane to face the teller; and a second inclined surface portion inclined at a second inclination angle with respect to the reference plane to face the customer, wherein the first inclination angle is larger than the second inclination angle.

The customer-side digital module unit may include a tablet, and wherein the tablet may be mounted in the portable board unit to be tilted at a predetermined angle in an up and down direction.

The portable transaction module may further include a teller-side digital module unit for providing a business service requested by the customer, wherein the teller-side digital module unit includes a teller-side monitor which is movably supported with respect to the portable board unit.

The portable transaction module may further include a partition for partitioning the space into a teller side space and a customer side space.

The partition may be configured as a transparent or opaque display including at least one of a liquid crystal display, a light emitting diode, and a head up display.

The portable transaction module may further include: a customer service passage through which the teller side space and the customer side space are communicate with each other; a first sterilization unit configured to sterilize the partition; and a second sterilization unit configured to sterilize the customer service passage.

The portable unit may include a portable block unit, wherein the portable block unit has a pentahedral shape having a triangular side cross-section.

The portable block unit may include: a bottom surface portion; a first inclined surface portion extends from one end of the bottom surface portion to incline to face the teller; and a second inclined surface portion extends from the other end of the bottom surface portion to incline to face the customer, wherein a first inclination angle of the first inclined surface portion with respect to the bottom surface portion is smaller than a second inclination angle of the second inclined surface portion with respect to the bottom surface portion.

The portable transaction module may further include: a portable plate unit on which the portable block unit is placed; and a partition for partitioning the space into a teller side space and a customer side space.

The partition may be configured as a transparent or opaque display including at least one of a liquid crystal display, a light emitting diode, and a head up display.

The portable transaction module may further includes: a customer service passage through which the teller side space and the customer side space are communicate with each other; a first sterilization unit configured to sterilize the partition; and a second sterilization unit configured to sterilize the customer service passage.

The portable transaction module may further include a teller-side digital module unit for providing a business service requested by the customer, wherein the teller-side digital module unit includes a teller-side monitor which is fixedly supported by the portable block unit.

The customer-side digital module unit may include: at least one of a sign pad, a pin pad, an identification card scanner, a seal scanner, a palm vein scanner, an NFC reader, and a fingerprint.

In accordance with the implementation of the present disclosure, it is possible to accurately distinguish between a device for the customer and a device for the teller at a bank window, and the customer can use the device for the customer.

In addition, it is possible to implement a self-banking service with face-to-face assist, thereby minimizing business services requested by customers and enhancing work efficiency.

Further, it is possible to minimize materials put on the desk through the digitalized work environment. Moreover, even in the epidemic of an infectious disease, smooth consultation can be performed between the teller and the customer since the possibility of infection is reduced.

DETAILED DESCRIPTION

Figure 1:
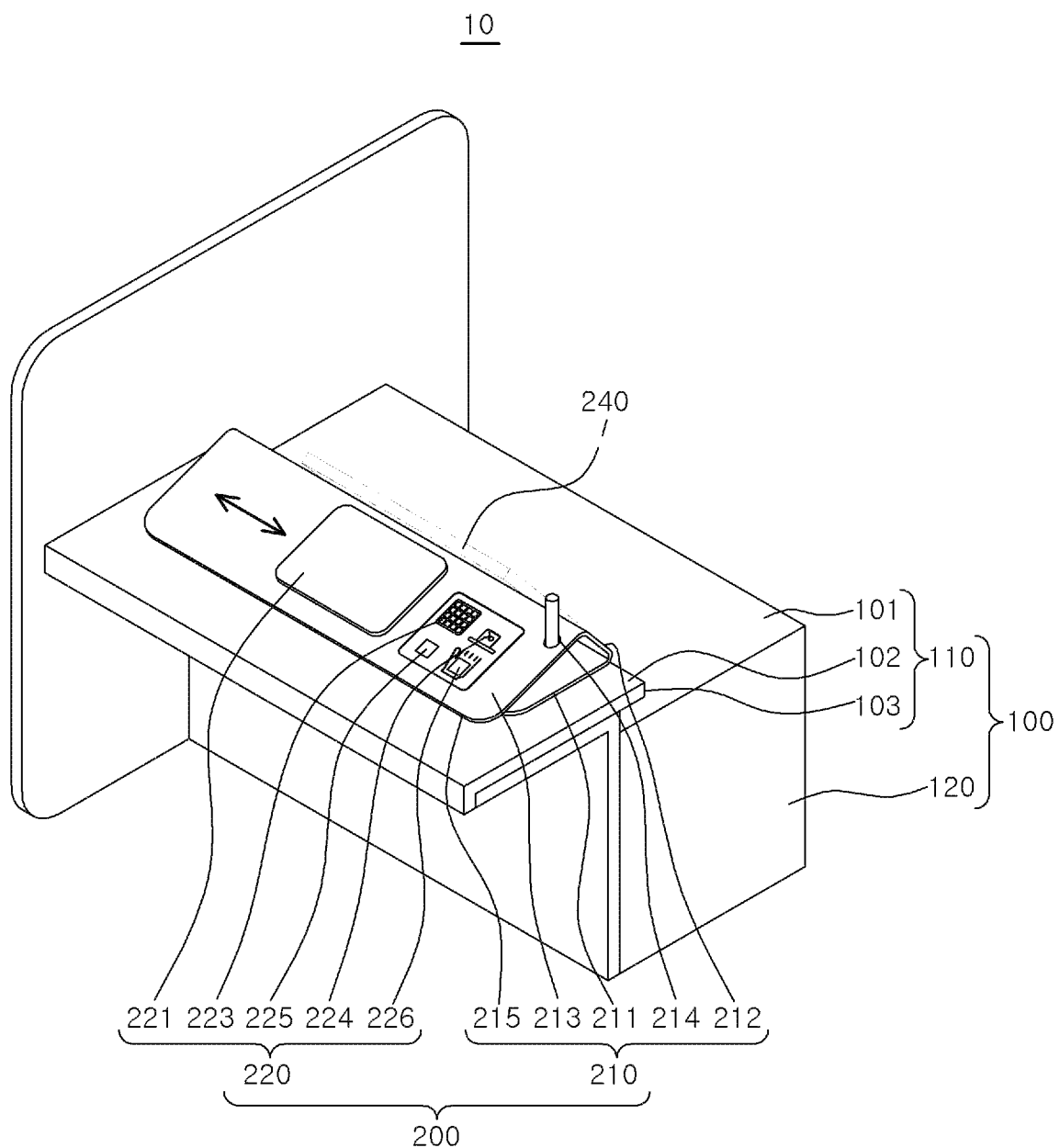
FIG. 1 is a perspective view showing a state in which a portable transaction module according to a first implementation of the present disclosure is mounted on a digital desk.

Hereinafter, configurations and operations of implementations will be described in detail with reference to the accompanying drawings. The following description is one of various patentable aspects of the disclosure and may form a part of the detailed description of the disclosure.

In describing the implementations of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various implementations. Specific implementations will be exemplarily illustrated in the drawings and described in the detailed description of the implementations. However, it should be understood that they are not intended to limit the disclosure to specific implementations but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms in the present disclosure are used simply to describe specific implementations without limiting the present disclosure. An expression used in the singular encompasses the expression of the plural, unless it has a clearly different meaning in the context.

Hereinafter, an implementation of the present disclosure will be described in detail with reference to the accompanying drawings.

A portable transaction module according to implementations of the present disclosure includes a portable unit. Further, the portable unit includes a portable board unit and a portable block unit which are described later.

Figure 2:
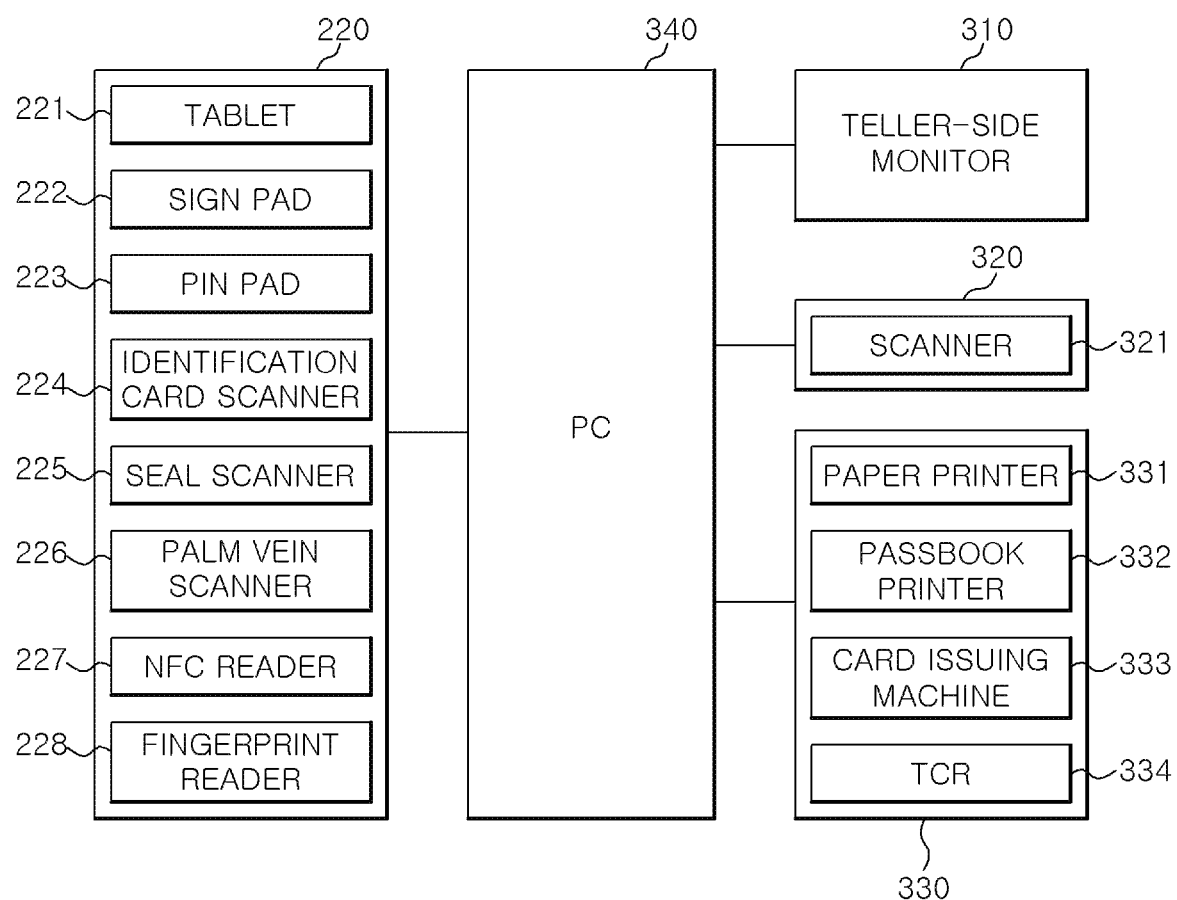
FIG. 2 is a block diagram showing a control flow of the portable transaction module according to the first implementation.
Figure 3:
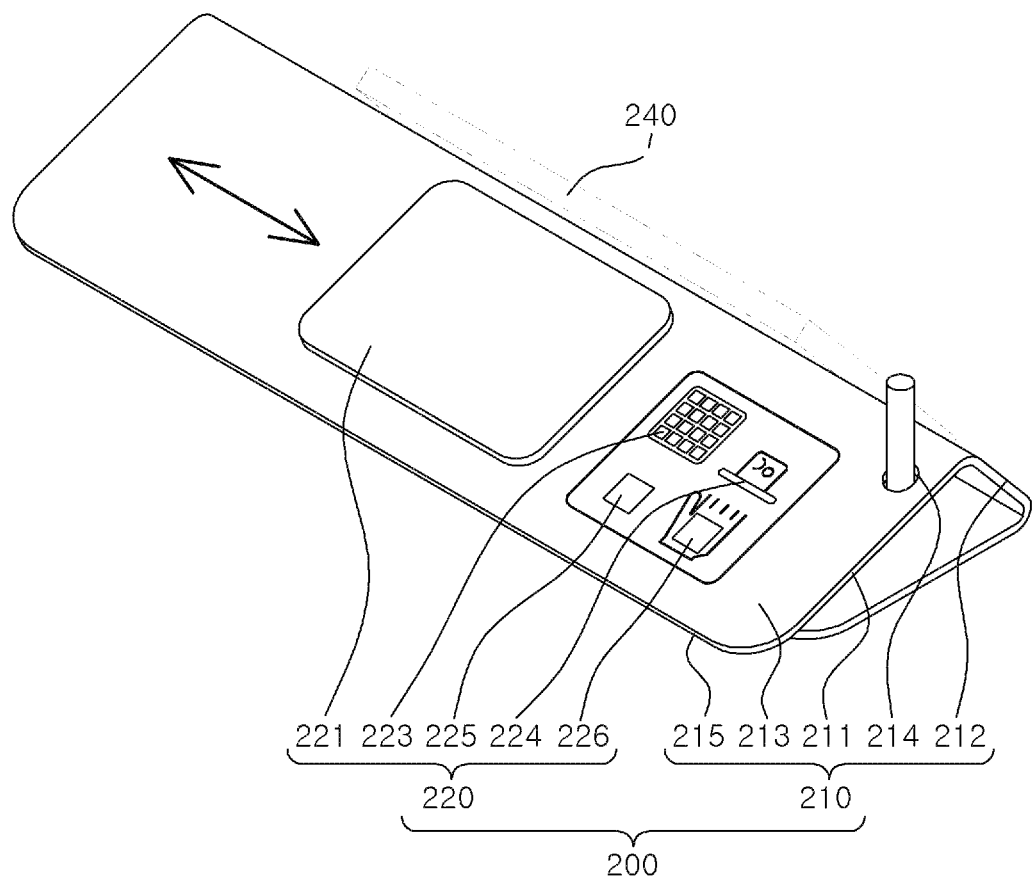
FIG. 3 is an enlarged perspective view of the portable transaction module according to the first implementation.
Figure 4:
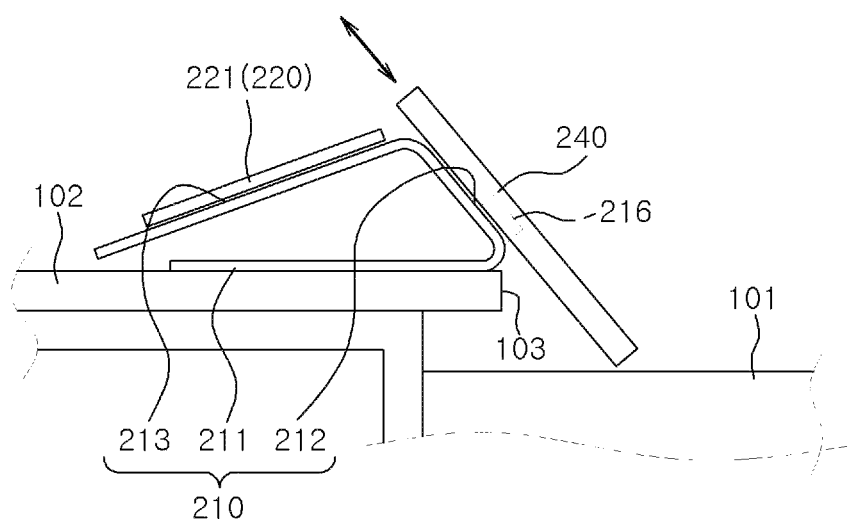
FIG. 4 is a diagram showing a state in which a monitor for a teller is mounted in the portable transaction module according to the first implementation.
Figure 5:
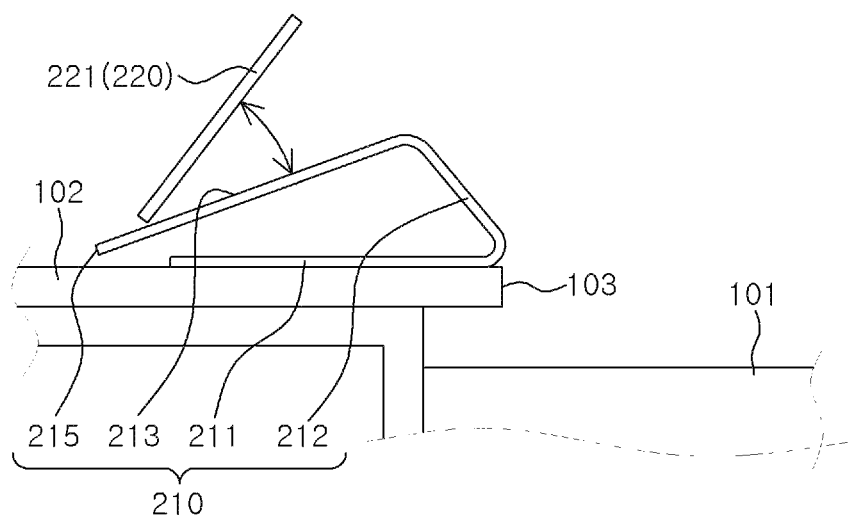
FIG. 5 is a view showing a state in which a tablet is tilted in the portable transaction module according to the first implementation.
Figure 6:
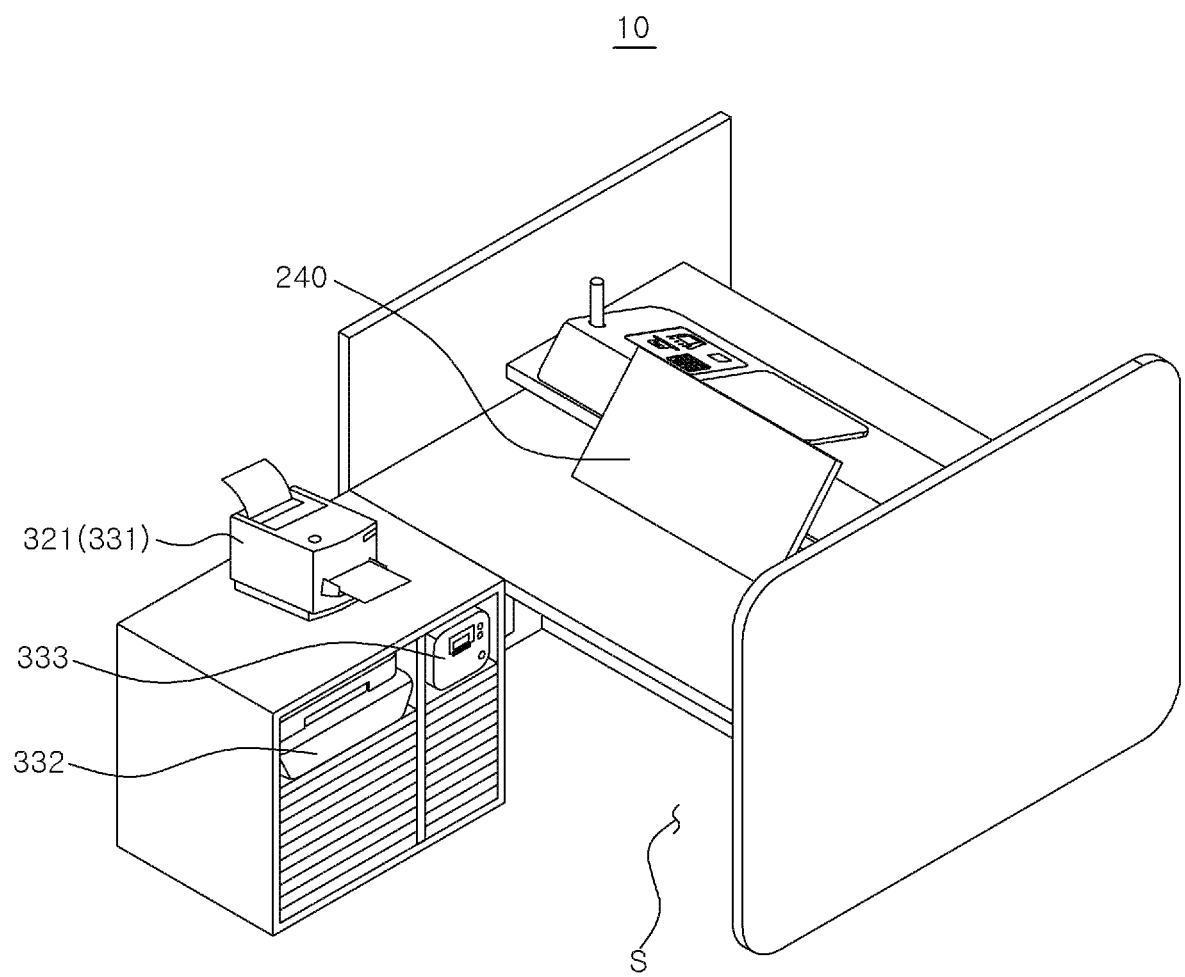
FIG. 6 is a perspective view of a digital desk on which the portable transaction module according to the first implementation is installed, as viewed from a teller side.
Figure 7:
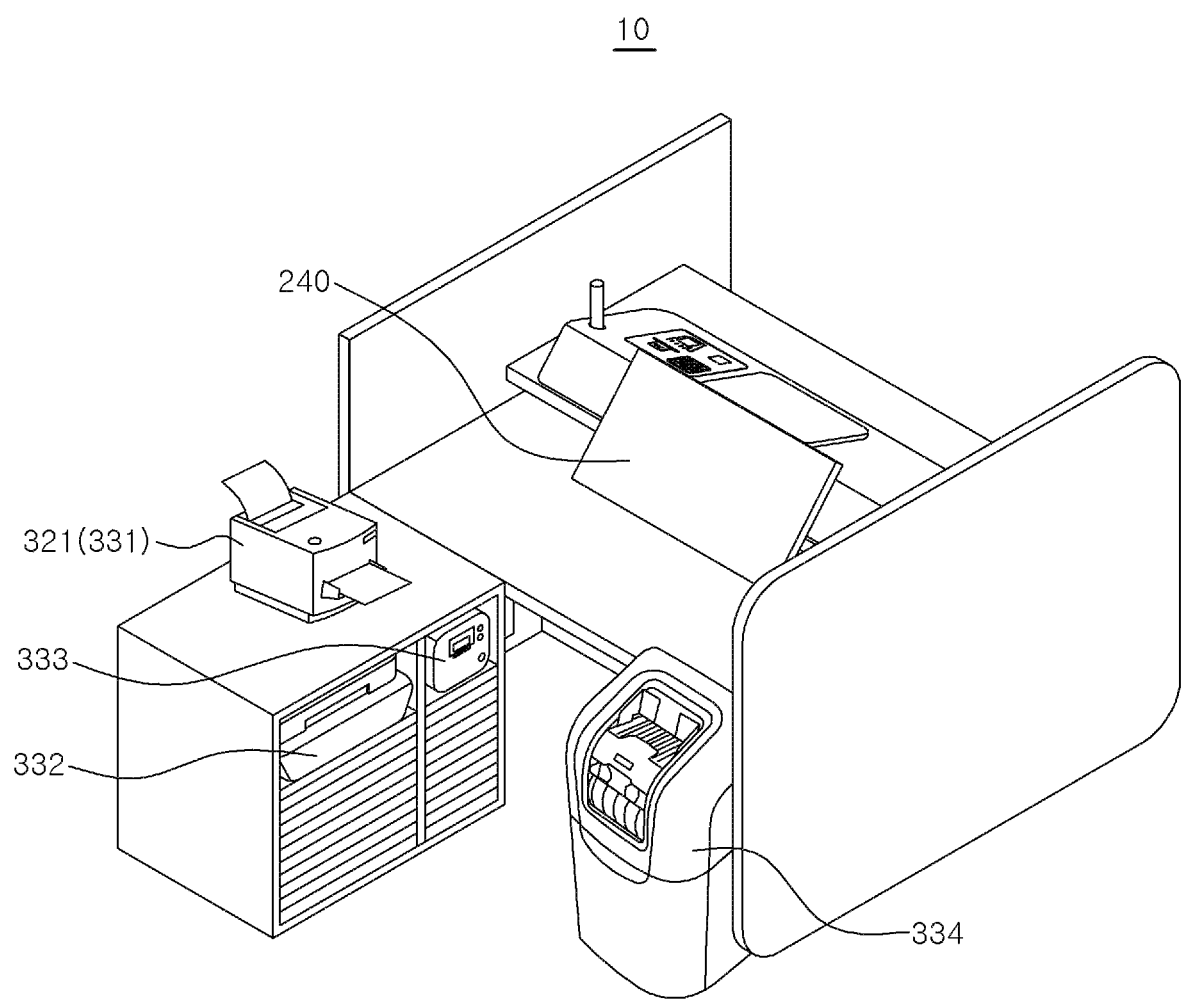
FIG. 7 is a perspective view of the digital desk shown in FIG. 6 to which a teller cash recycler (TCR) is provided, as viewed from the teller side.

FIG. 1 is a perspective view showing a state in which a portable transaction module according to a first implementation of the present disclosure is mounted on a digital desk, FIG. 2 is a block diagram showing a control flow of the portable transaction module according to the first implementation, and FIG. 3 is an enlarged perspective view of the portable transaction module according to the first implementation. FIG. 4 is a diagram showing a state in which a monitor for a teller is mounted in the portable transaction module according to the first implementation, FIG. 5 is a view showing a state in which a tablet is tilted in the portable transaction module according to the first implementation, FIG. 6 is a perspective view of a digital desk on which the portable transaction module according to the first implementation is installed, as viewed from a teller side, and FIG. 7 is a perspective view of the digital desk shown in FIG. 6 to which a teller cash recycler (TCR) is provided, as viewed from the teller side.

Referring FIGS. 1 to 7, a portable transaction module 200 according to the first implementation of the present disclosure includes a portable board unit 210, a customer-side digital module unit 220, and a teller-side digital module unit 240.

The portable board unit 210 may be removably placed on a customer-side desk portion 102 to be described later. The portable board unit 210 may include inclined surfaces which have different inclinations in a direction toward a customer and a direction toward a teller. The inclined surfaces of the portable board unit 210 may be formed by bending or folding a plate member having a board shape. In addition, at least one side of the portable board unit 210 may be opened without being covered by the plate member.

To that end, the portable board unit 210 may include a bottom surface portion 211, a first inclined surface portion 212 and a second inclined surface portion 213. For example, the bottom surface portion 211 of the portable board unit 210 is supported in a state of being in surface contact with a customer-side desk part 102 of a desk body 100 to be described later, so that the portable board unit 210 can be stably mounted on the customer-side desk part 102.

The first inclined surface portion 212 may extend inclined at a predetermined angle from one end of the bottom surface portion 211 to face the teller-side direction. The second inclined surface portion 213 may extend inclined at a predetermined angle from one end of the first inclined surface portion 212 to face the customer-side direction. An insertion hole 214 into which a writing instrument can be inserted may be formed in the second inclined surface portion 213.

In addition, the first inclined surface portion 212 may have a first inclination angle with respect to the bottom surface portion 211 as a reference plane and the second inclined surface portion 213 may have a second inclination angle with respect to the bottom surface portion 211 as the reference plane. In this case, the first inclination angle of the first inclined surface portion 212 may be larger than the second inclination angle of the second inclined surface portion 213. Accordingly, the inclination angle of a monitor of the teller-side digital module unit 240 placed on and supported by the first inclined surface portion 212 may be greater than the inclination angle of a tablet 221 of the customer-side digital module unit 220 placed on and supported by the second inclined surface portion 213.

The first inclined surface portion 212 may be provided with a guide rail 216 for guiding the teller digital module unit 240 in up and down directions. The guide rail 216 may be provided in a form of a rail that guides the teller digital module unit 240 in the up and down directions. The guide rail 216 guides the up-down movement of the teller digital module unit 240, so that the position of the teller digital module unit 240 can be appropriately adjusted according to a height of a stepped portion 103 of the desk body 100.

In addition, a notification lamp 215 may be provided at an end of the second inclined surface portion 213. The notification lamp 215 may be lit or flashed in response to an operation signal of a personal computer (PC) 340. As an example, the lighting/flashing of the notification lamp 215 may be a signal notifying that a waiting customer is in a state in which consultation with a teller is possible.

The bottom surface portion 211, the first inclined surface portion 212, and the second inclined surface portion 213 may be configured in a form of a bent plate in which the joint portions thereof are bent in a triangular shape. At least a part of the customer-side digital unit 220 may be mounted in the inner space of the bottom surface portion 211, the first inclined surface portion 212 and the second inclined surface portion 213.

In the present implementation, although the bottom surface portion 211, the first inclined surface portion 212, and the second inclined surface portion 213 are configured in the form of the bent plate in which the joint portions thereof are bent in a triangular shape, the present disclosure is not limited to the above. The overall shape of the portable board unit 210 may be variously changed.

The portable board unit 210 may be provided with the customer-side digital module unit 220 for inputting information necessary for business transactions. The customer-side digital module unit 220 may include at least one of a tablet 221, a sign pad 222, a pin pad 223, an identification card scanner 224, a seal scanner 225, a palm vein scanner 226, a near field communication (NFC) reader 227 and a fingerprint reader 228, which are used for information input.

In particular, the tablet 221 may be mounted to be tilted at a predetermined angle in the portable board unit 210. To that end, a conventional tilting device for tilting the tablet 221 at a predetermined angle may be applied to the portable board unit 210. As an example, the customer may rotate the tablet 221 about a hinge axis of the tilting device by pulling the tablet 221 by hand. Then, the rotation angle of the tablet 221 on the portable board unit 210 may be adjusted according to the viewing angle of the customer.

Further, the tablet 221 may be moved laterally on the second inclined surface portion 213 of the portable board unit 210. Accordingly, the customer can conveniently use the tablet 221 while placing the tablet 221 at a convenient point on the second inclined surface portion 213.

In the present implementation, although the customer-side digital module unit 220 is configured to include at least one of the tablet 221, the sign pad 222, the pin pad 223, the identification card scanner 224, the seal scanner 225, the palm vein scanner 226, the NFC reader 227 and the fingerprint reader 228, the present disclosure is not limited thereto. The customer-side digital module unit 220 may further include an additional device for information input.

The teller-side digital module unit 240 may provide a business service requested by a customer on the side of the teller-side desk portion 101. The teller-side digital module unit 240 may be a teller-side monitor which may be removably placed on the teller-side desk portion 101. A variety of information for providing a business service requested by a customer may be displayed on the teller-side monitor.

Figure 8:
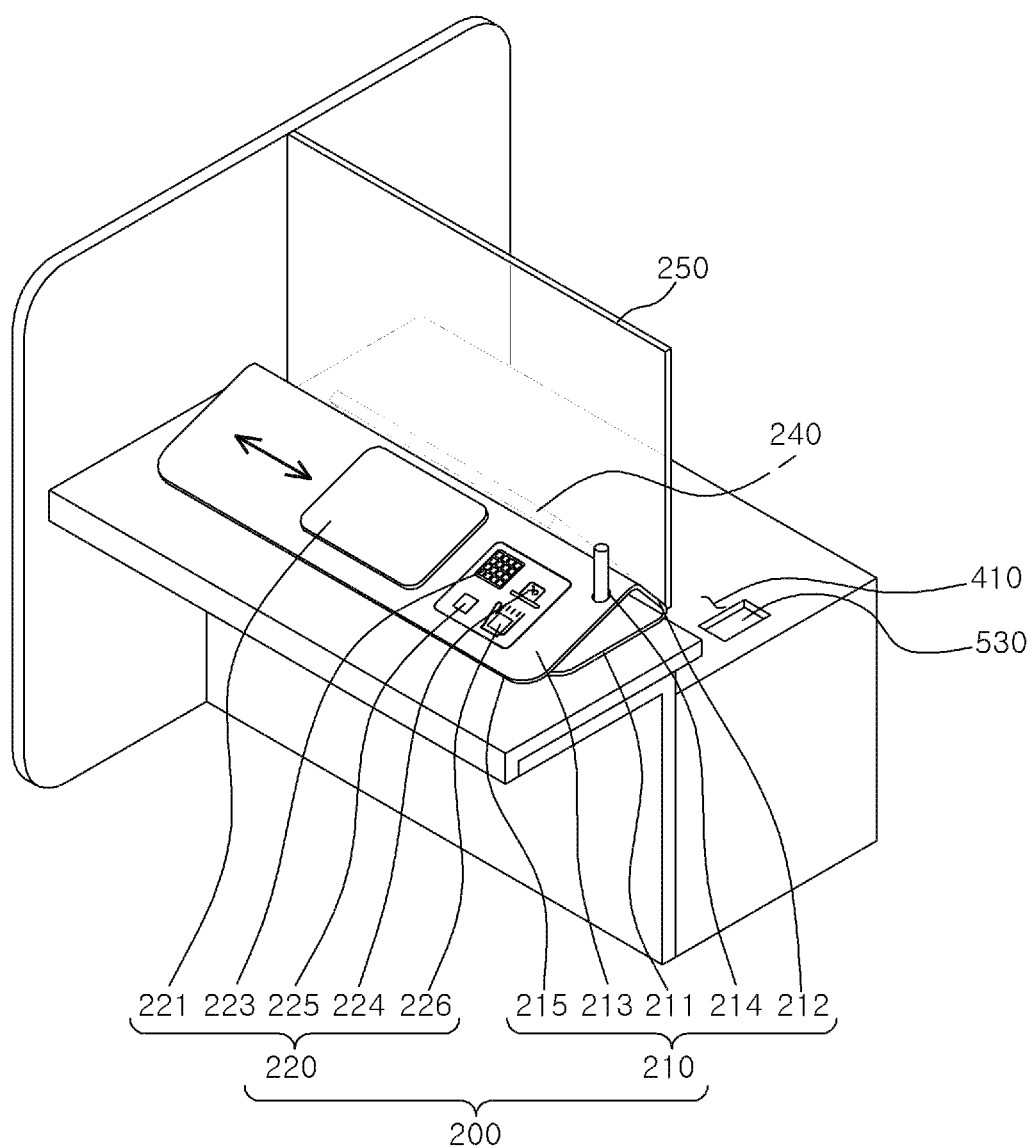
FIGS. 8 and 9 are perspective views showing states in which a portable transaction module according to a second implementation of the present disclosure is mounted on a digital desk.
Figure 9:
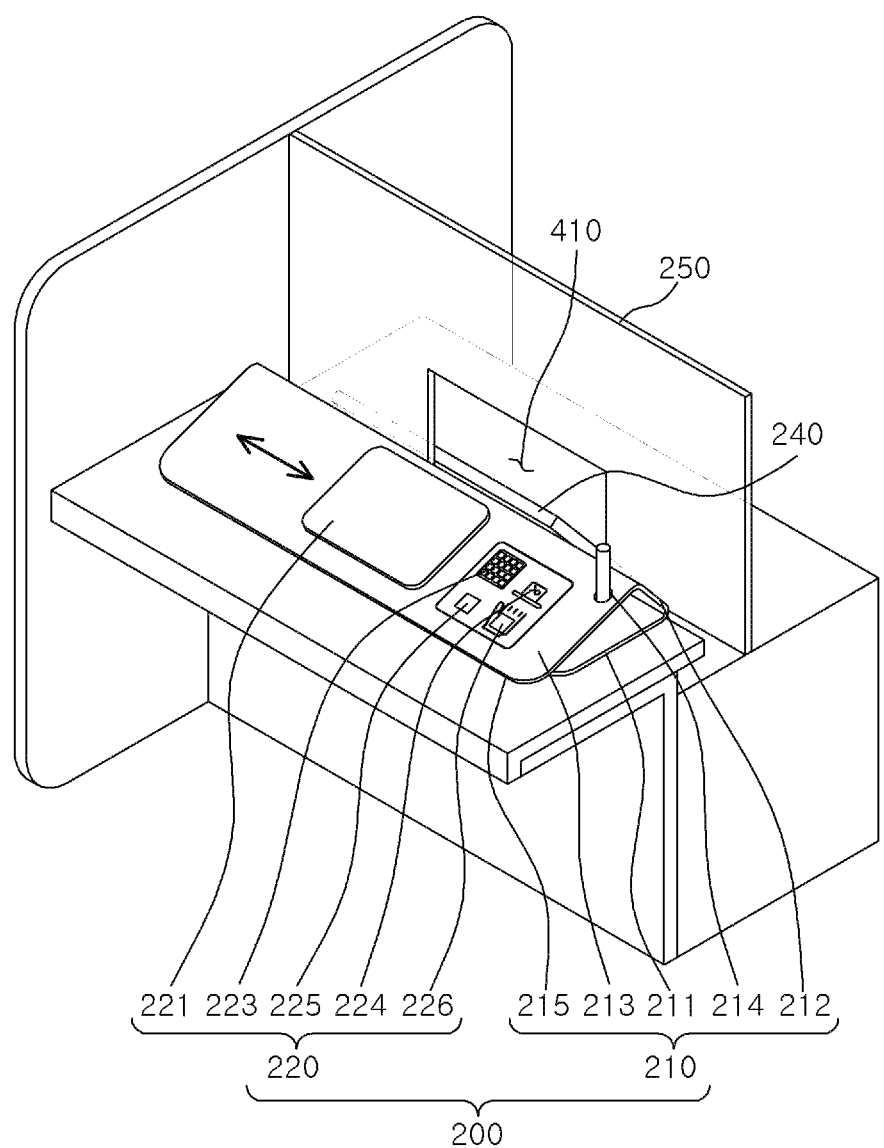

FIGS. 8 and 9 are perspective views showing states in which a portable transaction module according to a second implementation of the present disclosure is mounted on a digital desk.

As shown in FIGS. 8 and 9, a portable transaction module 200 according to the second implementation of the present disclosure includes a portable board unit 210, a customer-side digital module unit 220, a teller-side digital module unit 240, and a partition 250.

The second implementation has a difference from the above-described first implementation in that it further includes the partition 250 as compared with the first implementation. Accordingly, in describing the second implementation of the present disclosure, there will be described mainly the difference between the second implementation and the first implementation, and like reference numerals are given to like components and redundant description thereof will be omitted.

The partition 250 may be installed at a central portion on the desk body 100 to partition the desk body 100 into the teller-side desk portion 101 and the customer-side desk portion 102. In other words, the partition 250 may partition a space into a teller side space and a customer side space. The partition 250 may be configured as a display for outputting an image, and such a display may be a transparent display made of an entirely transparent material or an opaque display formed of at least a partly opaque material. As another example, the partition 250 may be provided in the form of a transparent plastic plate.

In case the partition 250 is configured as a display, the partition 250 may include at least one of a liquid crystal display (LCD), a light emitting diode (LED) and a head up display (HUD). The partition 250 may display information input by a teller through such a display. For example, the partition 250 may display business transaction information required for a business transaction or a business service requested by a customer, so that the customer can grasp at a glance the information input by the teller through the partition 250.

The partition 250 may provide a customer service passage 410 of a predetermined size for a business transaction between the teller and the customer. The teller side space and the customer side space may communicate with each other through the customer service passage 410. As an example, as shown in FIG. 8, the customer service passage 410 may be a space of a predetermined size provided on one side of the partition 250. A transfer tray 530 for transfer of business transaction documents between the teller and the customer may be positioned in the customer service passage 410. Alternatively, as shown in FIG. 9, the customer service passage 410 may be an opening of a predetermined size formed in a lower portion of the partition 250.

Figure 10:
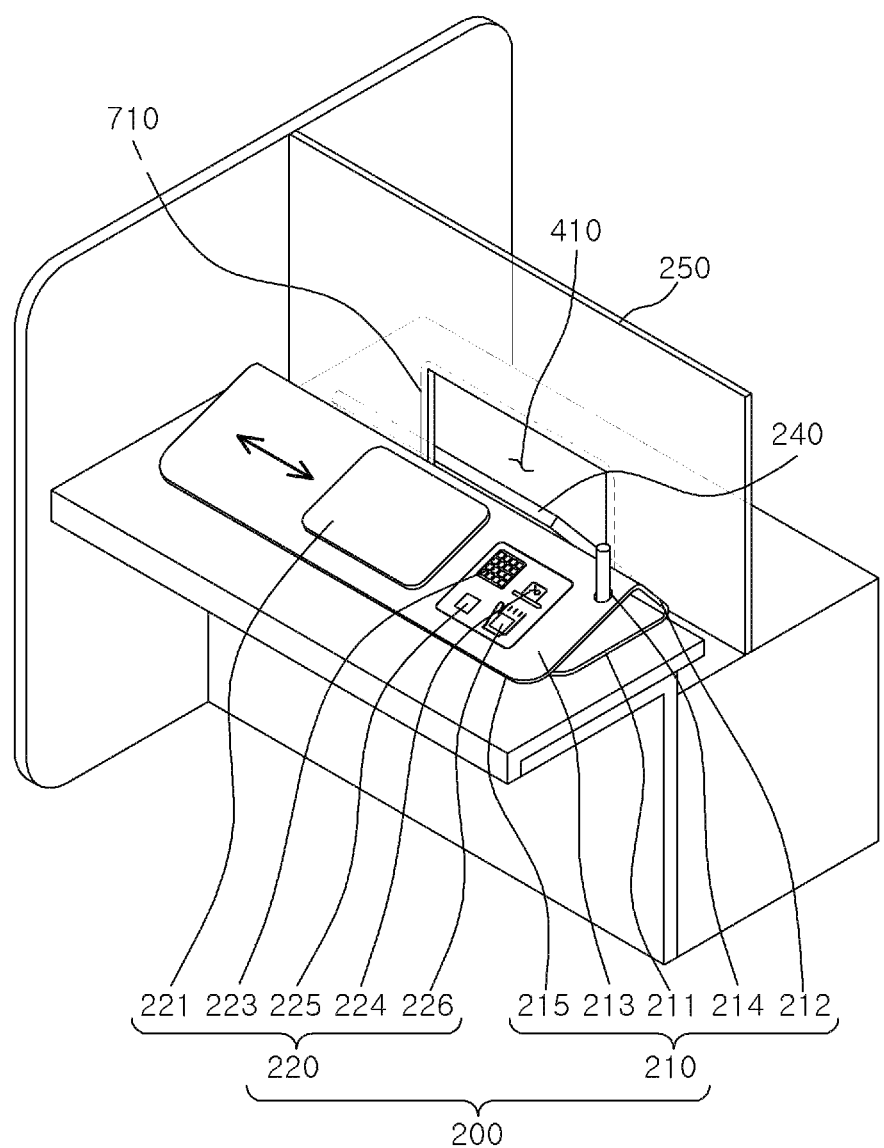
FIG. 10 is a perspective view showing a state in which a portable transaction module according to a modification of the second implementation of the present disclosure is mounted in a customer service passage.

FIG. 10 is a perspective view showing a state in which a portable transaction module according to a modification of the second implementation of the present disclosure is mounted on a digital desk.

As shown in FIG. 10, in the portable transaction module 200 according to the modification of the second implementation, the partition 250 and its surrounding may be sterilized through a first sterilization unit 710.

The first sterilization unit 710 may include a sterilization lamp provided at a lower end portion of the partition 250 to sterilize the partition 250. For example, the first sterilization unit 710 may be an ultraviolet (UV) sterilization lamp that irradiates UV light to the partition 250 to sterilize the partition 250.

Meanwhile, a digital desk 10 according to one implementation of the present disclosure may include a desk body 100, a portable transaction module 200, a teller-side input device 310, a teller-side output device 320, and a PC 340.

Specifically, the desk body 100 may be disposed at a window in a bank where a business transaction between a teller and a customer is performed. The desk body 100 may include an upper plate 110 and a support 120 supporting the upper plate 110.

The upper plate 110 may include a teller-side desk portion 101, a customer-side desk portion 102, and a stepped portion 103. The teller-side desk portion 101 and the customer-side desk portion 102 may be respective areas on the plate 110 which are partitioned by an imaginary border line. The imaginary border line may be a center line placed in the center of the upper plate 110, and the center line may extend in a left and right direction.

The teller-side desk portion 101 and the customer-side desk portion 102 may be disposed opposite to each other with the stepped portion 103 positioned therebetween. In this case, the teller-side desk portion 101 may be located below the customer-side desk portion 102. A bank teller may be positioned on the side of the teller-side desk portion 101. The teller-side desk portion 101 may provide a space for a teller's work on the upper plate 110.

A variety of office equipment and documents may be temporarily placed on the teller-side desk portion 101. In addition, at least one part of the teller-side digital unit 240 may be placed on the teller-side desk portion 101. For example, a teller-side monitor 310 may be placed on the teller-side desk portion 101.

Further, the customer-side desk portion 102 may provide a space for a customer on the upper plate 110. The portable transaction module 200 may be removably mounted at the customer-side desk portion 102. The customer-side desk portion 102 may be located above the teller-side desk portion 101.

In addition, the stepped portion 103 may be formed in the center portion of the desk body 100 so that the teller-side desk portion 101 and the customer desk portion 102 have a height difference. In this case, the teller-side desk portion 101 may be located below the customer-side desk portion 102 through the stepped portion 103.

The support 120 may be provided in the form of a pair of legs supporting both side ends of the upper plate 110. A desk space S into which a chair for a teller can be inserted may be provided between the pair of supports 120.

In the present implementation, the support 120 has a structure that supports both side ends of the upper plate 110 on the side of which a teller is located, but the present disclosure is not limited thereto. The support 120 may have a structure that supports both side ends of the upper plate 110 on the sides of which a teller and a customer are located.

The teller-side input device 320 may be connected to the PC 340 and the teller-side monitor 310. A teller may input information through the teller-side input device 320. The teller-side input device 320 may include a keyboard and a scanner 321 for information input.

The teller-side output device 330 may output data for business services under the control of the PC 340. The teller-side output device 330 may include at least one of a paper printer 331, a passbook printer 332, a card issuing machine 333, and a teller cash recycler (TCR) 334.

The paper printer 331, the passbook printer 332, the card issuing machine 333 and the TCR 334 may be located close to the teller-side desk portion 101 for convenience of access of the teller. For example, the paper printer 331, the passbook printer 332 and the card issuing machine 333 may be located on one side of the teller-side desk portion 101, and the TCR 334 may be located on the other side of the teller-side desk portion 101.

The PC 340 may include a PC device for controlling the teller-side monitor 310, the teller-side input device 320, and the teller-side output device 330. The PC 340 may be located in the desk space S located on the teller side. The PC 340 may be implemented by an operation device including a microprocessor, a memory and the like. The implementation method is obvious to those skilled in the art, and thus further detailed description thereof will be omitted.

Meanwhile, in addition to the above configurations, according to another modification of the second implementation of the present disclosure, the portable transaction module 200 may further include a second sterilization unit 720.

Figure 11:
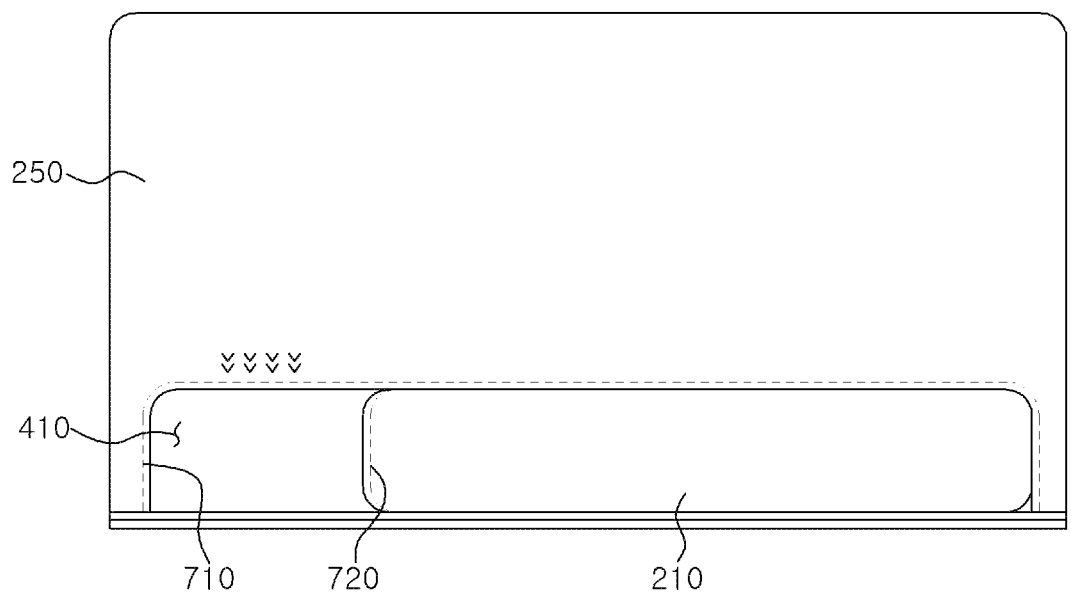
FIG. 11 is a front view showing a portable transaction module according to another modification of the second implementation of the present disclosure.

Referring FIG. 11, the partition 250 may provide a customer service passage 410 of a predetermined size for a business transaction between the teller and the customer. For example, the customer service passage 410 may be an opening of a predetermined size formed in a lower portion of the partition 250, the portable board unit 2110 may be arranged to be surrounded by a lower edge of the partition 250 so that the customer service passage 410 is located on its side, the portable board unit 210 may be provided so that the partition 250 is placed at the boundary between the first inclined surface portion 212 and the second inclined surface portion 213.

The second sterilization unit 720 may be installed at a side of the portable board unit 210 in order to sterilize the customer service passage 410 which allows the teller-side desk portion 101 and the customer-side desk portion 102 to communicate. The second sterilization unit 720 may be a UV sterilization lamp that sterilizes the customer service passage 410. The second sterilization unit 720 may be arranged to extend downward from the boundary between the first inclined surface portion 212 and the second inclined surface portion 213 (an upper edge of the portable board unit 210). In addition, when the side of the portable board unit 210 is open, the second sterilizing unit 720 may extend downward across the open space.

Hereinafter, a third implementation of the present disclosure will be described in detail with reference to FIGS. 12 to 18.

Figure 12:
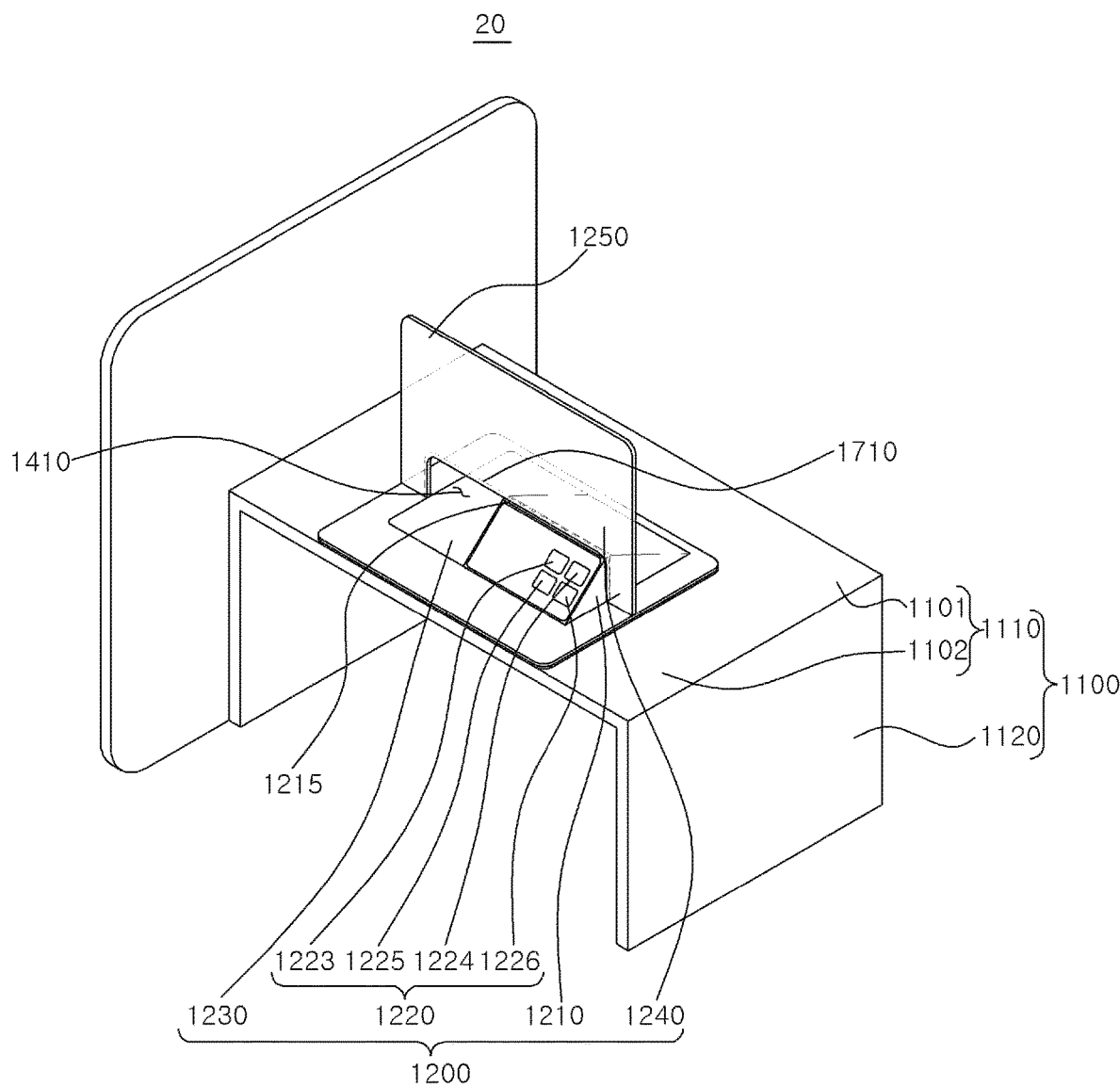
FIG. 12 is a perspective view showing a state in which a portable transaction module according to a third implementation of the present disclosure is mounted on a digital desk.
Figure 13:
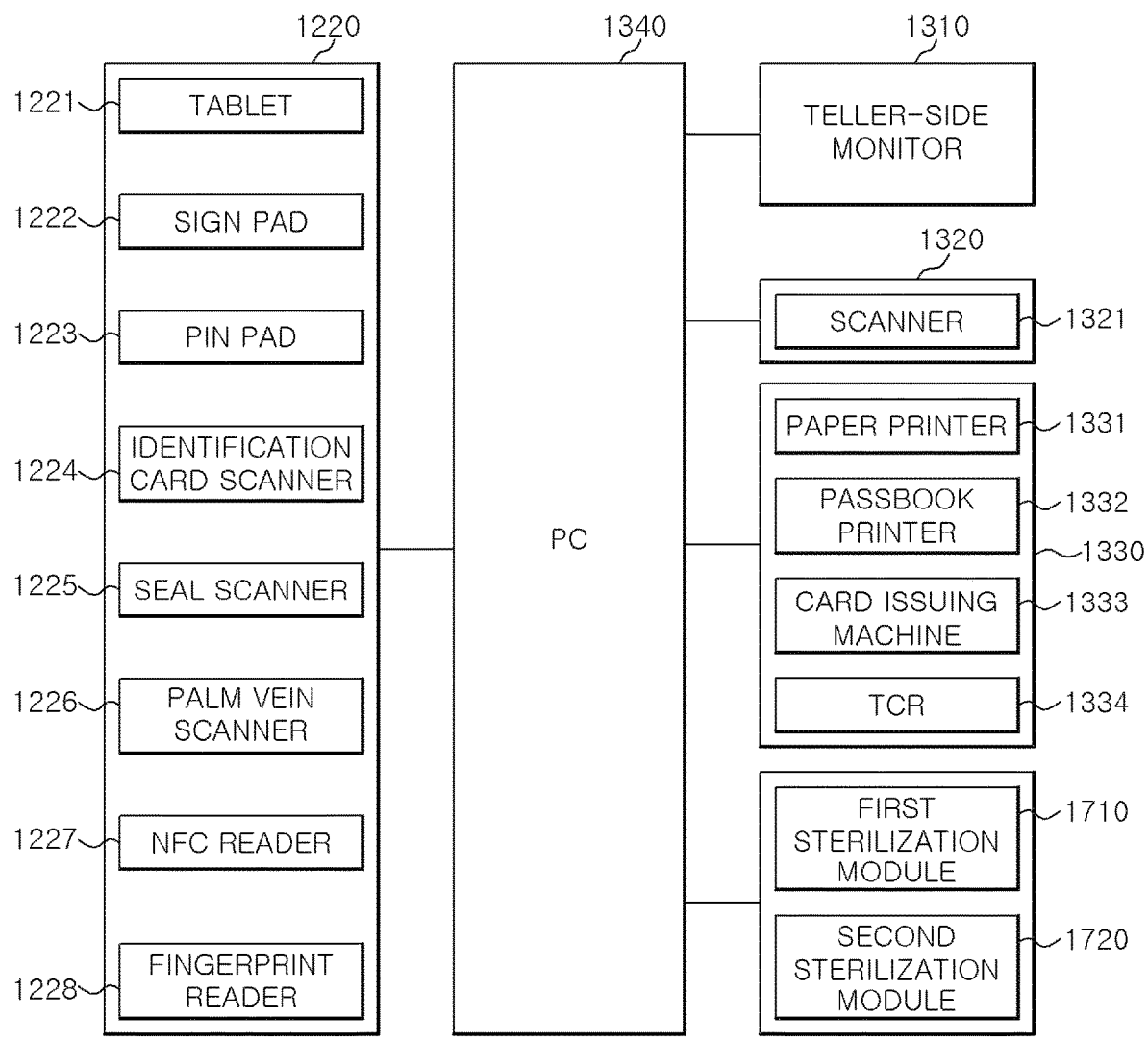
FIG. 13 is a block diagram showing a control flow of the portable transaction module according to the third implementation.
Figure 14:
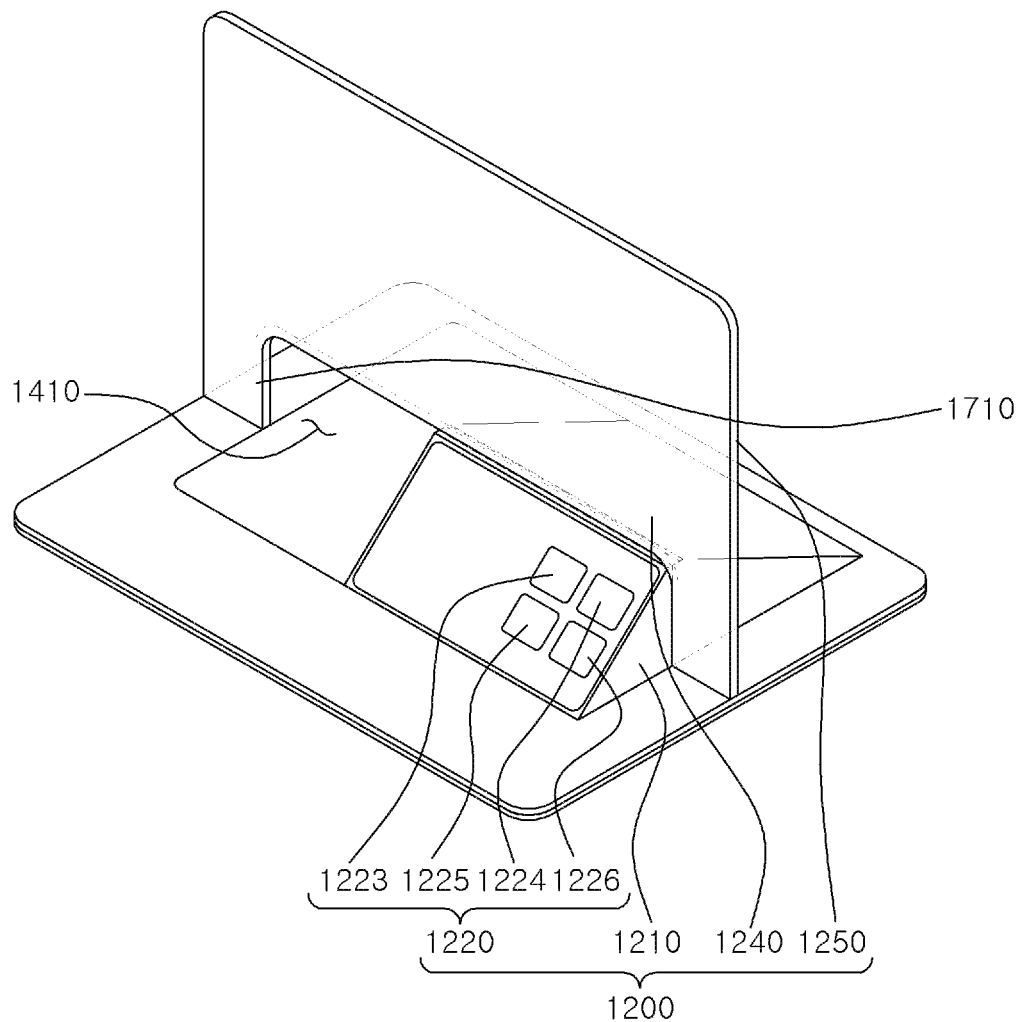
FIG. 14 is an enlarged perspective view of the portable transaction module according to the third implementation.
Figure 15:
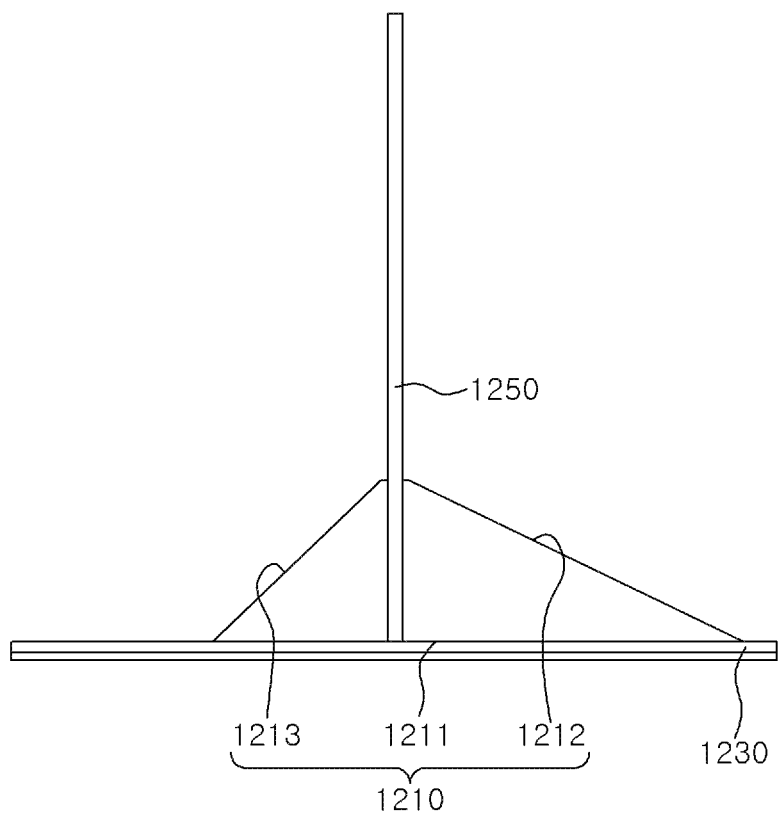
FIG. 15 is a side view showing a digital module of the portable transaction module according to the third implementation.

FIG. 12 is a perspective view showing a state in which a portable transaction module according to the third implementation of the present disclosure is mounted on a digital desk, FIG. 13 is a block diagram showing a control flow of the portable transaction module according to the third implementation, FIG. 14 is an enlarged perspective view of the portable transaction module according to the third implementation, and FIG. 15 is a side view showing a digital module of the portable transaction module according to the third implementation.

Referring FIGS. 12 to 15, a portable transaction module 1200 according to the third implementation of the present disclosure includes a portable block unit 1210, a customer-side digital module unit 1220, a portable plate unit 1230, a teller-side digital module unit 1240, and a partition 1250.

Specifically, the portable block unit 1210 may be provided in a pentahedral shape having a triangular side cross-section. The portable block unit 1210 may include a bottom surface portion 1211, a first inclined surface portion 1212 and a second inclined surface portion 1213. For example, the bottom surface portion 1211 of the portable block unit 1210 is supported in a state of being in face-contact with the portable plate unit 1230. The first inclined surface portion 1212 and the second inclined surface portion 1213 may be formed to be inclined at one end and the other end of the bottom surface part 1211.

The first inclined surface portion 1212 may extend inclined at a predetermined angle from one end of the bottom surface portion 1211 to face in a teller-side direction. A teller-side monitor may be provided at the first inclined surface portion 1212. A variety of information for providing a business service requested by a customer may be displayed on the teller-side monitor.

The second inclined surface portion 1213 may extend inclined at a predetermined angle from one end of the first inclined surface portion 1212 to face in a customer-side direction. The customer-side digital module unit 1220 may be provided at the second inclined surface portion 1213. Information necessary for business transactions may be inputted through the customer-side digital module unit 1220.

The first inclined surface portion 1212 and the second inclined surface portion 1213 may provide inclined surfaces which have different inclinations in the customer-side direction and in the teller-side direction.

The first inclined surface portion 1212 may have a first inclination angle with respect to the bottom surface portion 1211 as a reference plane and the second inclined surface portion 1213 may have a second inclination angle with respect to the bottom surface portion 1211 as the reference plane. In this case, the first inclination angle of the first inclined surface portion 1212 may be smaller than the second inclination angle of the second inclined surface portion 1213. Accordingly, the inclination angle of the teller-side monitor provided at the first inclined surface portion 1212 may be smaller than the inclination angle of the customer-side digital module unit 1220 provided at the second inclined surface portion 1213. Therefore, since the screen of the teller-side monitor can be provided in a larger size than that of the screen of a customer-side monitor, the teller can effectively secure the screen view.

A notification lamp 1215 may be provided at an upper end of the portable block unit 1210. The notification lamp 1215 may be lit or flashed in response to an operation signal of a personal computer (PC) 1340. As an example, the lighting/flashing of the notification lamp 1215 may be a signal notifying that a waiting customer is in a state in which consultation with a teller is possible.

In the present implementation, although the portable block unit 1210 is provided in a pentahedral shape in which the joint portions of the bottom surface portion 1211, the first inclined surface portion 1212 and the second inclined surface portion 1213 are bent in a triangular shape, the present disclosure is not limited to the above. The overall shape of the portable block unit 1210 may be variously changed.

The portable block unit 1210 may be provided with the customer-side digital module unit 1220 for inputting information necessary for business transactions. For example, the customer-side digital module unit 1220 may include at least one of a tablet 1221, a sign pad 1222, a pin pad 1223, an identification card scanner 1224, a seal scanner 1225, a palm vein scanner 1226, a near field communication (NFC) reader 1227 and a fingerprint reader 1228, which are used for information input.

In the present implementation, although the customer-side digital module unit 1220 is configured to include at least one of the tablet 1221, the sign pad 1222, the pin pad 1223, the identification card scanner 1224, the seal scanner 1225, the palm vein scanner 1226, the NFC reader 1227 and the fingerprint reader 1228, the present disclosure is not limited thereto. The customer-side digital module unit 1220 may further include an additional device for information input.

The portable plate unit 1230 may be provided in the form of a support plate detachably mounted on a customer desk portion 1102 of a desk body 1100 to be described later. The portable block unit 1210 may be placed at a central portion on an upper surface of the portable plate unit 1230. In addition, the partition 1250 may be installed at side portions on the upper surface of the portable plate unit 1230.

The teller-side digital module unit 1240 may include devices for processing a business service requested by a customer. For example, the teller-side digital module unit 1240 may include the teller-side monitor fixed to and supported by the portable block unit 1210.

The partition 1250 may be installed at a central portion on the desk body 1100 to partition the desk body 1100 into the teller-side desk portion 1101 and the customer-side desk portion 1102. In other words, the partition 1250 may partition a space into a teller side space and a customer side space. The partition 1250 may be configured as a display for outputting an image, and such a display may be a transparent display made of an entirely transparent material or an opaque display formed of at least a partly opaque material. As another example, the partition 1250 may be provided in the form of a transparent plastic plate.

In case the partition 1250 is configured as a display, the partition 1250 may include at least one of a liquid crystal display (LCD), a light emitting diode (LED) and a head up display (HUD). The partition 1250 may display information input by a teller through such a display. For example, the partition 1250 may display business transaction information required for a business transaction or a business service requested by a customer, so that the customer can grasp at a glance the information input by the teller through the partition 1250.

The partition 1250 may provide a customer service passage 1410 of a predetermined size for a business transaction between the teller and the customer. The teller side space and the customer side space may communicate with each other through the customer service passage 1410. As an example, the customer service passage 1410 may be provided in a form of an opening of a predetermined size in a lower portion of the partition 1250, and the portable block unit 1210 may be arranged to be surrounded by a lower edge of the partition 1250 so that the customer service passage 1410 is provided on its side. Alternatively, the customer service passage 1410 may be provided in a form of a space of a predetermined size provided at one side of the partition 1250.

The first sterilization unit 1710 may include a sterilization lamp provided at a lower end portion of the partition 1250 to sterilize the partition 1250. For example, the first sterilization unit 1710 may be an ultraviolet (UV) sterilization lamp that irradiates UV light to the partition 1250 and its surroundings to sterilize the partition 1250 and its surroundings.

The second sterilization unit 1720 may include a sterilization lamp provided at a side portion of the portable block unit in order to sterilize the customer service passage 1410 which allows the teller-side desk portion 1101 and the customer-side desk portion 1102 to communicate. For example, the second sterilization unit 1720 may be a UV sterilization lamp that sterilizes the customer service passage 1410. The second sterilization unit 1720 may be arranged to extend downward from the boundary between the first inclined surface portion 1212 and the second inclined surface portion 1213 (an upper edge of the portable block unit 1210).

Figure 16:
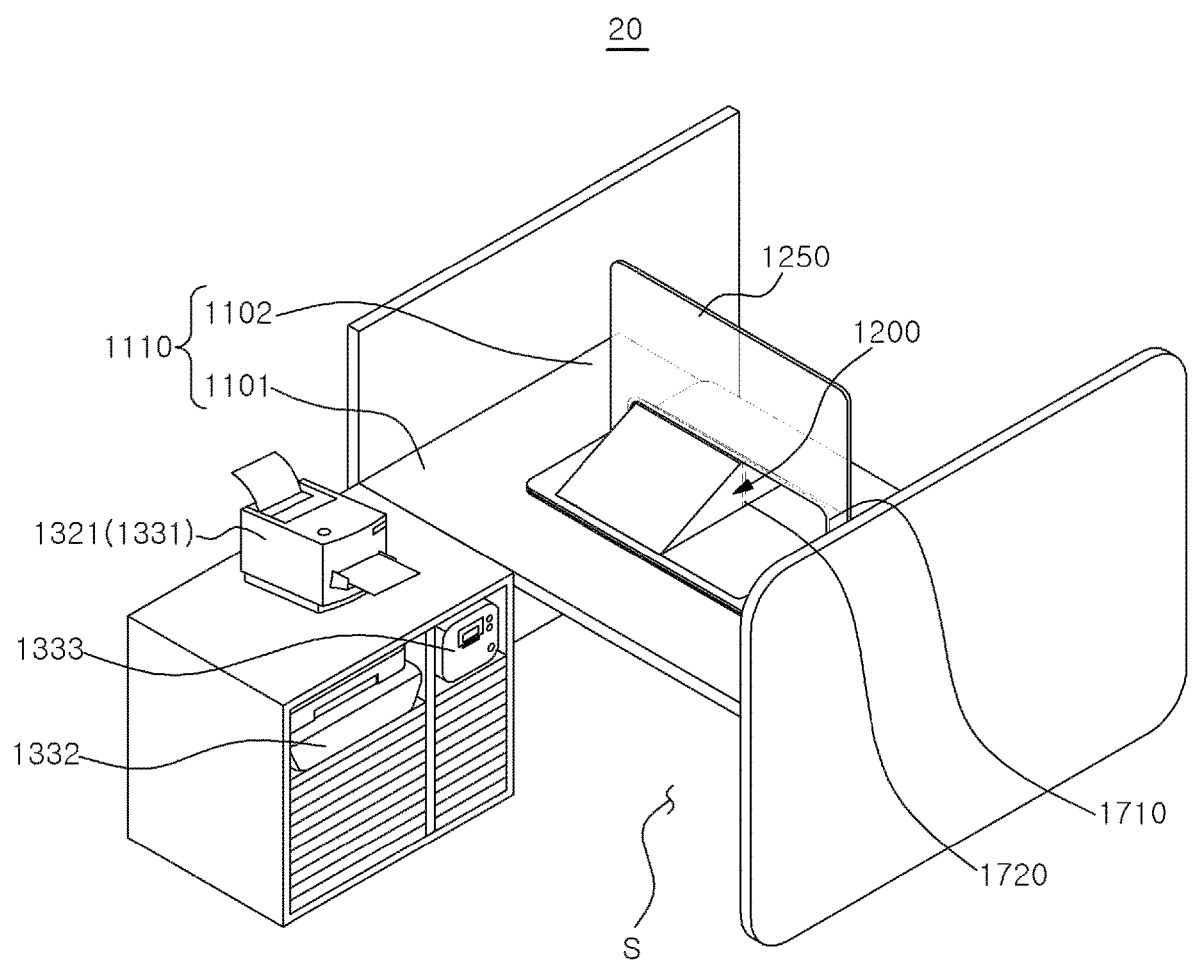
FIG. 16 is a perspective view of a digital desk on which the portable transaction module according to the third implementation is installed, as viewed from a teller side.
Figure 17:
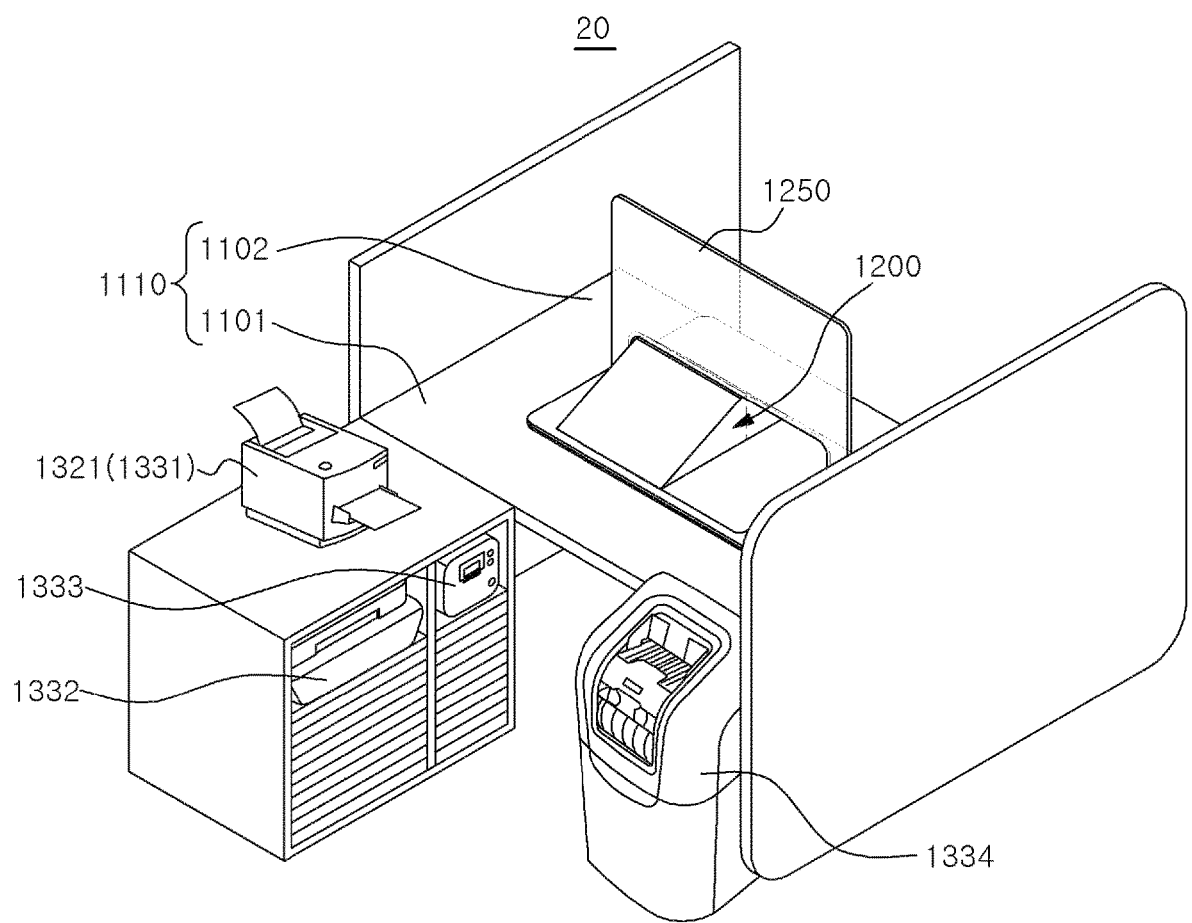
FIG. 17 is a perspective view of the digital desk shown in FIG. 16 to which a teller cash recycler (TCR) is provided, as viewed from the teller side.

FIG. 16 is a perspective view of a digital desk on which the portable transaction module according to the third implementation is installed, as viewed from a teller side, and FIG. 17 is a perspective view of the digital desk shown in FIG. 16 to which a teller cash recycler (TCR) is provided, as viewed from the teller side.

Further, as shown in FIGS. 16 and 17, a digital desk 20 according to one implementation of the present disclosure may include a desk body 1100, a portable transaction module 1200, a teller-side input device 1320, a teller-side output device 1330, and a PC 1340.

Specifically, the desk body 1100 may be disposed at a window in a bank where a business transaction between a teller and a customer is performed. The desk body 1100 may include an upper plate 1110 and a support 1120 supporting the upper plate 1110.

The upper plate 1110 may include a teller-side desk portion 1101, a customer-side desk portion 1102, and a stepped portion 1103. The teller-side desk portion 1101 and the customer-side desk portion 1102 may be respective areas on the plate 1110 which are partitioned by an imaginary border line. The imaginary border line may be a center line placed in the center of the upper plate 1110, and the center line may extend in a left and right direction.

The teller-side desk portion 1101 and the customer-side desk portion 1102 may be disposed opposite to each other. A bank teller may be positioned on the side of the teller-side desk portion 1101. The teller-side desk portion 1101 may provide a space for a teller's work on the upper plate 1110. A variety of office equipment and documents may be temporarily placed on the teller-side desk portion 1101. In addition, at least one part of the customer-side digital module unit 1220 may be placed on the teller-side desk portion 1101.

Further, the customer-side desk portion 1102 may provide a space for a customer on the upper plate 1110. The customer-side desk portion 1102 may be distinguished from the teller-side desk portion 1101 by the partition 1250 interposed therebetween. At least one part of the customer-side digital module unit 1220 may be placed on the customer-side desk portion 1102.

The support 1120 may be provided in the form of a pair of legs supporting both side ends of the upper plate 1110. A desk space S into which a chair for a customer or a chair for a teller can be inserted may be provided between the pair of supports 1120. In the present implementation, the support 1120 has a structure that supports both side ends of the upper plate 1110 on the sides of which a teller and a customer are located, but the present disclosure is not limited thereto. The support 1120 may have a structure that supports both side ends of the upper plate 1110 on the side of which a teller is located.

The teller-side input device 1320 may be connected to the PC 1340 and the teller-side monitor 1310. A teller may input information through the teller-side input device 1320. The teller-side input device 1320 may include a keyboard and a scanner 1321 for information input.

The teller-side output device 1330 may output data for business services under the control of the PC 1340. The teller-side output device 1330 may include at least one of a paper printer 1331, a passbook printer 1332, a card issuing machine 1333, and a teller cash recycler (TCR) 1334.

The paper printer 1331, the passbook printer 1332, the card issuing machine 1333 and the TCR 1334 may be located close to the teller-side desk portion 1101 for convenience of access of the teller. For example, the paper printer 1331, the passbook printer 332 and the card issuing machine 1333 may be located on one side of the teller-side desk portion 1101, and the TCR 1334 may be located on the other side of the teller-side desk portion 1101.

The PC 1340 may include a PC device for controlling the teller-side monitor 1310, the teller-side input device 1320, and the teller-side output device 1330. The PC 1340 may be located in the desk space S located on the teller side. The PC 1340 may be implemented by an operation device including a microprocessor, a memory and the like. The implementation method is obvious to those skilled in the art, and thus further detailed description thereof will be omitted.

Figure 18:
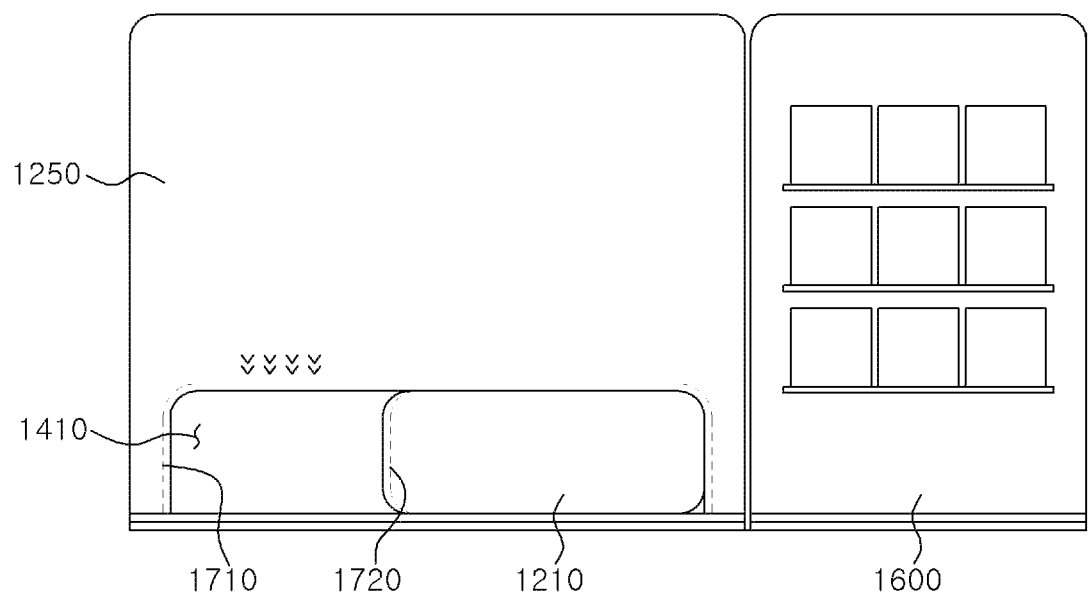
FIG. 18 is a front view showing a digital desk according one implementation of the present disclosure to which an advertisement module is additionally installed.

FIG. 18 is a front view showing a digital desk according one implementation of the present disclosure to which an advertisement module is additionally installed.

As shown in FIG. 18, an advertisement module 1600 may be additionally installed to the desk body 1100. The advertisement module 1600 may be provided at one side of the desk body 1100, and may be arranged to be perpendicular to the upper plate 1110.

The advertisement module 1600 may include a display which is capable of displaying specific information, photographs, graphs and the like, and such a display may be at least one of an LCD, an LED, or an HUD.

The advertisement module 1600 may provide an advertisement board function for advertising a product of a bank, for example. Accordingly, a customer may receive information on various types of bank products through the advertisement module 1600. As described above, in accordance with the implementations of the present disclosure, it is possible to accurately distinguish between a device for the customer and a device for the teller at a bank window, and the customer can use the device for the customer. In addition, it is possible to implement a self-banking service with face-to-face assist, thereby minimizing business services requested by customers and enhancing work efficiency. Further, it is possible to minimize materials put on the desk through the digitalized work environment. Moreover, even in the epidemic of an infectious disease, smooth consultation can be performed between the teller and the customer since the possibility of infection is reduced.

While the implementations of the present disclosure have been described with reference to the accompanying drawings, it will be understood by those skilled in the art that the present disclosure can be implemented in other specific forms without changing the technical spirit or essential features of the present disclosure. For example, those skilled in the art can implement the present disclosure in the form that is not clearly described in the implementations of the present disclosure by changing materials, sizes and the like of the respective components depending on application fields or by combining or replacing the implementations without departing from the scope of the present disclosure. Therefore, it should be noted that the above-described implementations are merely illustrative in all aspects and are not to be construed as limiting the present disclosure and also that the modifications are included in the technical spirit of the present disclosure which is described in the following claims.

What is claimed is:

1. A portable transaction module to be placed at a space where business transactions between a teller and a customer are performed, the portable transaction module comprising:
   a portable unit; and
   a customer-side digital module unit mounted at one side of the portable unit and configured to receive information related to the business transactions,
   wherein the portable unit comprises a portable board unit defined by bending a plate member having a board shape, and
   wherein at least one side of the portable board unit is opened.

2. The portable transaction module of claim 1, wherein the portable board unit includes:
   a bottom surface portion having a reference plane;
   a first inclined surface portion inclined at a first inclination angle with respect to the reference plane to face the teller; and
   a second inclined surface portion inclined at a second inclination angle with respect to the reference plane to face the customer, wherein the first inclination angle is larger than the second inclination angle.

3. The portable transaction module of claim 2, wherein the customer-side digital module unit includes a tablet that is mounted in the portable board unit and tilted at a predetermined angle in an up and down direction.

4. The portable transaction module of claim 2, further comprising a teller-side digital module unit configured to provide a business service requested by the customer,
   wherein the teller-side digital module unit includes a teller-side monitor which is movably supported with respect to the portable board unit.

5. The portable transaction module of claim 1, further comprising:
   a partition configured to partition the space into a teller side space and a customer side space.

6. The portable transaction module of claim 5, wherein the partition comprises a transparent or opaque display including at least one of a liquid crystal display, a light emitting diode, or a head up display.

7. The portable transaction module of claim 5, further comprising:
   a customer service passage through which the teller side space and the customer side space are communicate with each other;
   a first sterilization unit configured to sterilize the partition; and
   a second sterilization unit configured to sterilize the customer service passage.

8. The portable transaction module of claim 1, wherein the customer-side digital module unit comprises:
   at least one of a sign pad, a pin pad, an identification card scanner, a seal scanner, a palm vein scanner, a near field communication (NFC) reader, or a fingerprint reader.

9. A portable transaction module to be placed at a space where business transactions between a teller and a customer are performed, the portable transaction module comprising:
   a portable unit; and
   a customer-side digital module unit mounted at one side of the portable unit and configured to receive information related to the business transactions,
   wherein the portable unit comprises a portable block unit that has a pentahedral shape having a triangular side cross-section,
   wherein the portable block unit comprises:
       a bottom surface portion;
       a first inclined surface portion extends from one end of the bottom surface portion to incline to face the teller; and
       a second inclined surface portion extends from the other end of the bottom surface portion to incline to face the customer, and
   wherein a first inclination angle of the first inclined surface portion with respect to the bottom surface portion is smaller than a second inclination angle of the second inclined surface portion with respect to the bottom surface portion.

10. The portable transaction module of claim 9, further comprising:
    a portable plate unit on which the portable block unit is placed; and
    a partition for partitioning the space into a teller side space and a customer side space.

11. The portable transaction module of claim 10, wherein the partition comprises a transparent or opaque display including at least one of a liquid crystal display, a light emitting diode, or a head up display.

12. The portable transaction module of claim 10, further comprising:
    a customer service passage through which the teller side space and the customer side space are communicate with each other;
    a first sterilization unit configured to sterilize the partition; and
    a second sterilization unit configured to sterilize the customer service passage.

13. The portable transaction module of claim 9, further comprising:
    a teller-side digital module unit for providing a business service requested by the customer,
    wherein the teller-side digital module unit includes a teller-side monitor which is fixedly supported by the portable block unit.

14. The portable transaction module of claim 9, wherein the customer-side digital module unit comprises:
    at least one of a sign pad, a pin pad, an identification card scanner, a seal scanner, a palm vein scanner, a near field communication (NFC) reader, or a fingerprint reader.

* * * * *